(12) United States Patent
Chapman

(10) Patent No.: US 6,232,731 B1
(45) Date of Patent: *May 15, 2001

(54) MULTI-CHANNEL MOTOR WINDING CONFIGURATION AND PULSE WIDTH MODULATED CONTROLLER

(75) Inventor: John H. Chapman, Groton, CT (US)

(73) Assignee: Electric Boat Corporation, Groton, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,056

(22) Filed: Jun. 26, 1997

(51) Int. Cl.[7] .................................................. H02P 7/29
(52) U.S. Cl. ........................... 318/293; 318/432; 318/496; 388/907.2
(58) Field of Search .................................. 318/280, 287, 318/291, 293, 432, 494, 495, 496, 519; 388/907.2

(56) References Cited

U.S. PATENT DOCUMENTS

| | | | |
|---|---|---|---|
| 3,569,805 | 3/1971 | Hammond | 318/227 |
| 3,947,736 | 3/1976 | Byers | 318/227 |
| 3,967,173 | 6/1976 | Stich | 318/227 |
| 4,159,513 | 6/1979 | Gemp et al. | |
| 4,290,001 | 9/1981 | Espelage | 318/811 |
| 4,337,429 | 6/1982 | Stuart | 318/811 |
| 4,447,786 | 5/1984 | Saar et al. | 318/811 |
| 4,882,524 * | 11/1989 | Lee | 318/254 |
| 4,924,168 | 5/1990 | Horie et al. | 318/811 |
| 5,017,855 | 5/1991 | Byers et al. | 318/811 |
| 5,051,680 * | 9/1991 | Belanger | 318/701 |

(List continued on next page.)

FOREIGN PATENT DOCUMENTS

| | | |
|---|---|---|
| 1982423 | 5/1998 | (DE) . |
| 2641912 * | 1/1989 | (FR) . |
| WO19458 | 9/1993 | (WO) . |

OTHER PUBLICATIONS

Ahmed, Irfan, *Digital Control Applications with the TMS 320 Family*, pp. 3–12, Texas Instruments Incorporation (1991).

Ahmed et al., Digital Signal Processors Simplifying high–performance control, Machine Design, pp. 13–17, and pp. 35–81, Sep. 10, 1987.

Bucella et al., Taking Control with DSPs, Machine Design, pp. 19–26, Oct. 12, 1989.

Hanselmann, Herbert, Using Digital Signal Processors for Control, IECON '86, IEEE, pp. 27–32 (1986).

*Primary Examiner*—Bentsu Ro
(74) *Attorney, Agent, or Firm*—Baker Botts

(57) ABSTRACT

A multi-channel motor winding configuration providing low harmonic distortion and a PWM inverting controller for this type of winding configuration are disclosed. The motor winding configuration includes a plurality of individually insulated conductors wound in a group through the stator slots of a synchronous or induction type alternating current (AC) motor. Depending on the winding configuration, the group of conductors may constitute a portion of or the entire current carried by one phase of a single or polyphase motor. The PWM controller for this type of winding configuration connects each conductor in the group to its own dedicated set of power switching devices in an H-bridge configuration. The H-bridge configuration is powered by a direct current (DC) or rectified AC source. The power switching devices are switched on and off in sequence with the duration each switching device remains on being proportional to the difference between the total current in the group of conductors and a predefined target current waveform that is desired for each phase of the motor or portion of a phase.

23 Claims, 10 Drawing Sheets

U.S. PATENT DOCUMENTS

| | | | |
|---|---|---|---|
| 5,294,875 | 3/1994 | Reddy | 318/801 |
| 5,337,227 | 8/1994 | Stacey et al. | |
| 5,386,182 * | 1/1995 | Nikami | 318/293 |
| 5,572,098 * | 11/1996 | Dreon et al. | 318/293 |
| 5,619,112 * | 4/1997 | Younessi et al. | 318/689 |
| 5,656,910 * | 8/1997 | Erckert | 318/685 |
| 5,661,379 * | 8/1997 | Johnson | 318/139 |
| 5,786,673 * | 7/1998 | Johnson | 318/139 |
| 5,955,854 * | 9/1999 | Zhang et al. | 318/480 |

* cited by examiner

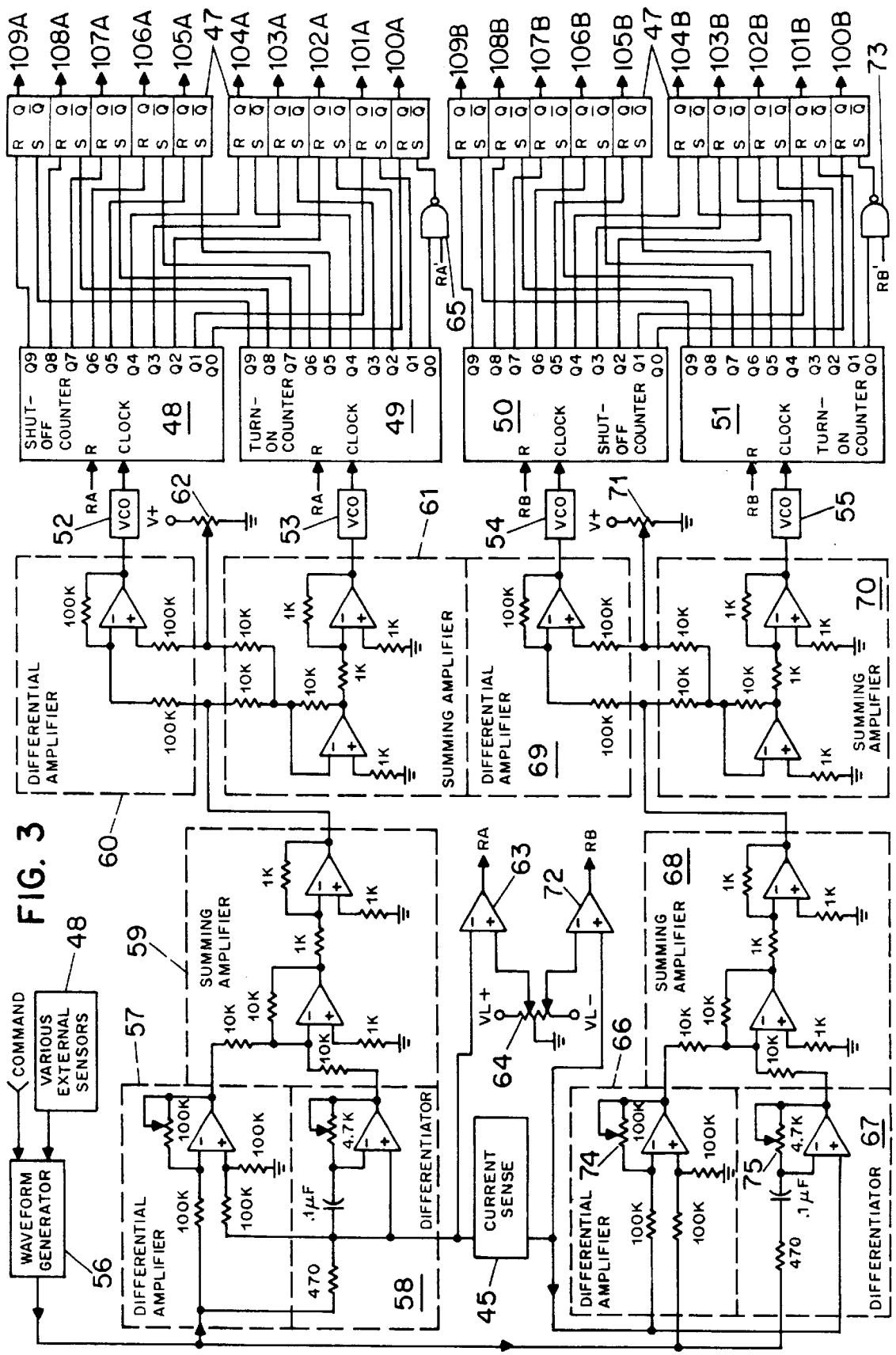

MULTI-CHANNEL MOTOR WINDING CONFIGURATION AND PULSE WIDTH MODULATED CONTROLLER

This invention relates to a multi-channel motor winding arrangement which produces an alternating current waveform with low harmonic distortion. The alternating current waveform may be used in a single phase or polyphase synchronous or induction type alternating current motor. This invention also relates to a controller for producing an alternating current waveform exhibiting low harmonic distortion for use in motors or other apparatus constituting inductive loads.

BACKGROUND OF THE INVENTION

A number of pulse width modulation (PWM) inverters have been developed for converting direct current (DC) power or fixed frequency alternating current (AC) power to variable frequency AC power for the purpose of driving AC synchronous or induction motors at variable speeds. Also, a large number of permanent magnet (PM) motors have been developed which resemble AC synchronous motors in construction but are typically driven by a controller that only provides an electronically commutated waveform to the stator windings, similar to that generated by the mechanical commutator in a DC motor. However, full-fledged variable frequency inverters are also being used more commonly in recent years to drive these PM motors, particularly in the higher rating devices. This is primarily because the high frequency components generated by hard-switching electronic commutation results in unacceptable dielectric cycling of insulation as well as hysteresis and eddy current heating in larger motors unless expensive insulation, lamination and conductor types are used in the construction of the motor.

The use of PWM inverters allows effective operation of higher rating motors incorporating conventional lamination and conductor types. However, these motor controllers are still typically limited to ratings of several hundred kilowatts. This rating limitation is primarily due to the ratings of power switching devices currently available and the circuit configurations in which they are typically used. Currently available power switching devices for high voltage (e.g., 500–4500v), high speed switching (e.g., 10–40 KHZ), and high current (e.g., 50–400 A) applications are limited to insulated-gate bipolar transistors (IGBT's). Certain other devices can be used, such as thyristors, plain bipolar junction transistors (BJT's), Darlington BJT's and metal oxide semiconductor (MOS) controlled BJT's with some associated compromise in performance or cost. Other devices under development, such as MOS controlled thyristors (MCT's), promise higher current capacity with comparable voltage and switching speed ratings, which would make current PWM inverter configurations practical at power levels in the several megawatt range or higher. Unfortunately, these devices will require special protection features to avoid the hazards of high-current explosive faults and may require higher switching speeds than devices of lower ratings to avoid parasitic losses in the stator windings and laminations due to harmonic distortion of the inverted waveform. This latter problem could lead to expensive modifications in the motor construction (e.g., thinner laminations and smaller wire gauges), particularly in large motors, to avoid damage to insulation from excessive heating and unacceptable performance losses.

SUMMARY OF THE INVENTION

It is an object of the present invention to provide an improved multi-channel electromagnetic winding arrangement for high rating devices.

Another object of the invention is to provide an improved method for providing current waveforms to multi-channel electromagnetic devices.

It is further object of the subject invention to provide a PWM inverter suitable for driving various classes of AC synchronous and induction motors as well as PM motors, that provides low harmonic distortion of the inverted waveform, can be designed for virtually unlimited motor ratings and uses currently available power switching devices, the only restrictions being that the motor windings carrying the inverted waveform(s) are a group of individual conductors, insulated from one another and that each conductor is connected to its own dedicated power switching devices in an H-bridge or other equivalent configuration.

These and other objects of the invention are attained by providing a multi-channel electromagnetic winding arrangement comprising an electromagnetic winding including devices for generating at least one current waveform comprising at least two channels. At least one switching device controls each channel and is dedicated thereto. The arrangement also includes a control unit for controlling the switching means so as to produce a composite current waveform from the current waveforms generated by each channel.

The invention also provides a controller for producing waveforms in a multi-channel electromagnetic winding arrangement having at least one switch for controlling current through each channel in the arrangement. The controller turns each switch on and off in a predetermined sequence at a rate which is varied in response to the magnitude of the difference between the composite current waveform produced from current waveforms generated by each channel and a desired current waveform. In an alternate controller arrangement, the switches associated with each channel turned on at a fixed interval, each channel being slightly offset from the other, and the duration that each switch remains on is varied by a control signal that represents the voltage waveform to be generated by the control means, or a control signal that varies in response to deviations of the measured current waveform and the target current waveform.

BRIEF DESCRIPTION OF THE DRAWINGS

Further objects and advantages of the present invention will be more fully appreciated from a reading of the following detailed description when considered with the accompanying drawings wherein.

FIG. 3 is a schematic representation of an analog control circuit for a multi-channel waveform synthesizer in accordance with the invention;

DETAILED DESCRIPTION OF THE PREFERRED EMBODIMENT

Figure 1:
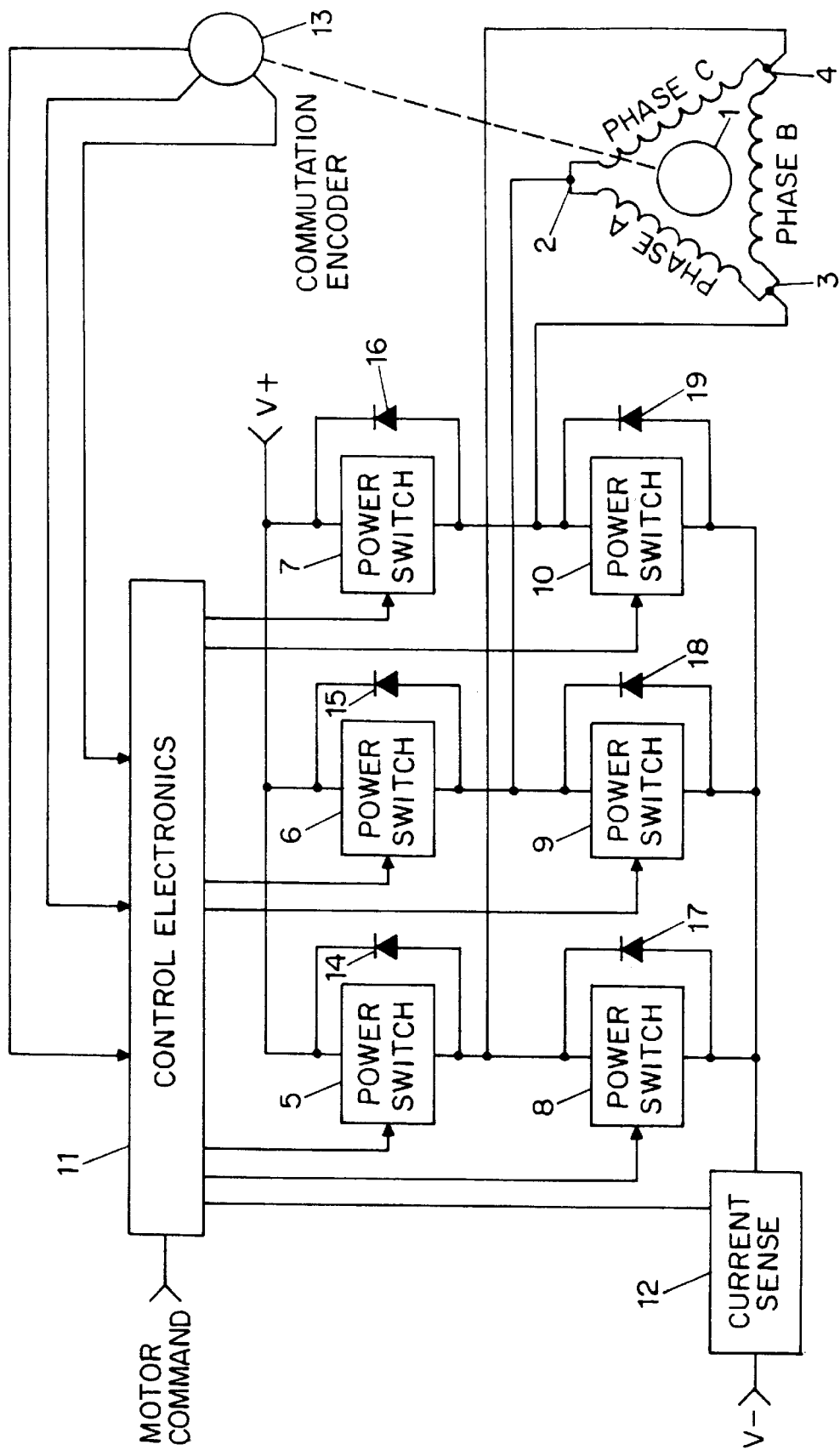
FIG. 1 is a schematic representation of a conventional electronic commutation system.

A typical conventional electronic commutation arrangement for a 3-phase motor is shown in FIG. 1. This type of an arrangement is typically used for PM DC motors whose construction is essentially the same as an AC synchronous motor, except that the magnetic poles on the motor rotor are formed by permanent magnets. Therefore, this type of arrangement may be used to drive an AC synchronous motor from a DC power source. This arrangement may also be used to drive AC induction motors. However, as discussed in more detail below, certain features of typical AC synchronous and induction motor construction may result in performance degradation and motor damage if a simple commutated waveform is used.

As shown in FIG. 1, a conventional electronic commutation arrangement includes a motor rotor 1, motor stator winding terminals 2, 3 and 4, power switching devices 5, 6, 7, 8, 9 and 10, control electronics 11 which receive input from an optional current sensor 12 and commutation encoder 13. Each power switching device also incorporates a free-wheeling diode, 14, 15, 16, 17, 18 and 19 to allow inductive flyback energy to be safely dissipated when the power switches are turned off. In this illustration, the motor is shown having three phase windings A, B and C, which is common, but other numbers of phases can also be used. In addition, while a "delta" winding configuration is illustrated in FIG. 1, other winding configurations such as a "Wye" may also be used.

The electronic commutation scheme illustrated in FIG. 1 would drive the motor rotor 1 by switching the power switches on and off in a sequence such as:

| Sequence No. | Power Switch Number | | | | | |
| --- | --- | --- | --- | --- | --- | --- |
|  | 5 | 6 | 7 | 8 | 9 | 10 |
| 1 | OFF | ON | OFF | OFF | OFF | ON |
| 2 | OFF | ON | OFF | ON | OFF | OFF |
| 3 | OFF | OFF | ON | ON | OFF | OFF |
| 4 | OFF | OFF | ON | OFF | ON | OFF |
| 5 | ON | OFF | OFF | OFF | ON | OFF |
| 6 | ON | OFF | OFF | OFF | OFF | ON |

The above pattern of power switch transitions, or an equivalent pattern corresponding to an alternate winding configuration, is typically stored in a memory device or hard-wired within the control electronics 11. An input/output (I/O) port of at least 6 bits in length would be used to identify which power switches should be on or off by providing logic level (e.g., 0 to 5v) signals to appropriate driver circuitry for the power switching devices used. The commutation encoder 13 can be used to identify when the next pattern in the transition sequence identified above should be shifted to the I/O port driving the power switches. Alternately, the sequence can be shifted through the I/O port at a fixed interval as determined by the "motor command" input. This later method can be used to control the motor speed by increasing or decreasing the rate at which the power switch transition sequence is shifted through the I/O port.

However, at low rotor speeds, it is typically necessary to provide some degree of current limiting because back EMF from the motor, which typically provides inherent current limiting in the motor, decreases with motor speed. This is usually accomplished by using the current sensor 12 to measure current to the motor and shut-off any power switches that are on when a predetermined safe current limit is exceeded. The power switches are allowed to switch back on when current falls below the predetermined limit. The current is regulated in a manner similar to a "buck-boost" type switch mode regulator which effectively increases or decreases the applied DC voltages V+ to control current.

The features described above for the electronic commutating motor controller shown in FIG. 1 are common to many types of conventional solid state motor controllers. However, the hard commutated waveform resulting from this type of controller creates strong high frequency components which are applied to the motor windings along with the drive current that is applied at the fundamental electrical frequency of the rotor. These high frequency components are filtered to some extent by the stator winding inductance, but often result in: (1) excessive hysteresis and eddy current losses in the motor laminations unless more expensive lamination materials are used, (2) skin effect losses in the stator windings unless special fine gauge wire is used (e.g., "litz" wire), and (3) breakdown of stator winding insulation unless high temperature/cycle life insulation is used. Even if the best grades of materials are used in the construction of the motor, these factors typically become limiting constraints on overall motor performance as motor rating is increased.

For this reason, manufacturers and users of large PM motors and AC motors interested in obtaining the benefits provided by solid state motor controllers (e.g., variable motor speed, current limiting, etc.) most often use variable frequency inverters that produce closer approximations of sinusoidal AC waveforms. However, ratings for solid state inverters are currently limited by the switching speeds and current ratings of power semiconductor switching devices presently available. For example, the most popular switching devices currently available in the 500–4500 v operating range for high current switching (e.g., 100–400 A) are IGBT's. Devices currently available are typically rated at maximum PWM switching frequencies of 20–40 KHZ. However, much lower frequencies are preferred (e.g.; 1–3 KHZ) to obtain maximum device current ratings. The lower power switching frequencies decrease power dissipation in the switching devices caused by the decreased number of transitions through the linear region of the switching devices. On the other hand, high PWM switching frequencies to produce a higher resolution AC waveform with lower harmonic distortion which minimizes losses in the motor. As a result, a compromise frequency of 3–8 KHZ is typically chosen as the switching frequency in order to obtain acceptable switching device power dissipation and motor losses with minimized harmonic distortion. Nevertheless, with currently available IGBT current ratings this frequency range still only yields maximum motor/controller ratings of 300–500 KW, even if employing the limited amount of switching device paralleling that can be implemented using interphase transformers and the like.

Figure 2:
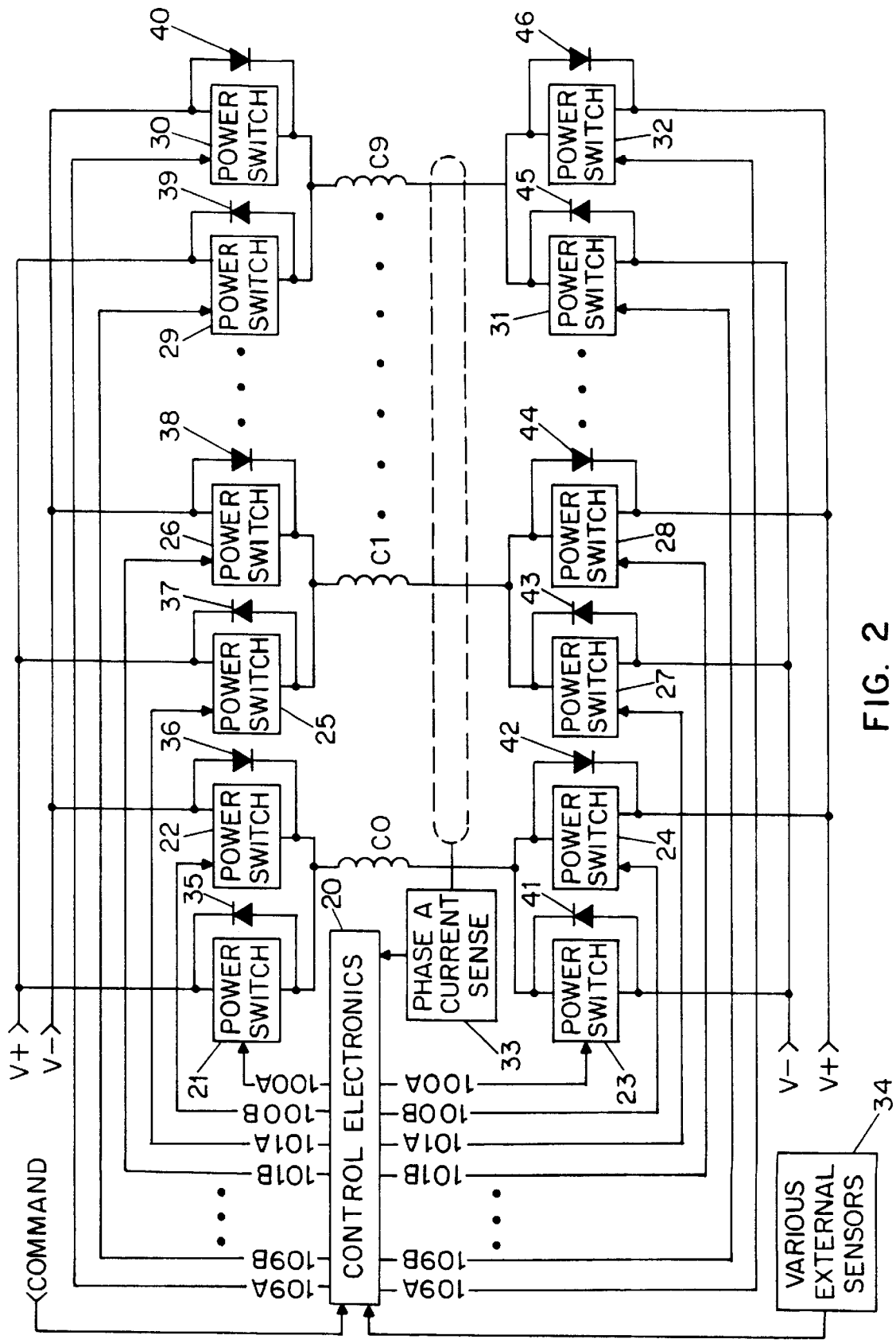
FIG. 2 is a schematic representation of a multi-channel current waveform synthesizer in accordance with the invention.

A multi-channel electromagnetic winding arrangement which provides low harmonic distortion and may be scaled to virtually any rating (>10 MW) in accordance with the invention is shown in FIG. 2. FIG. 2 illustrates an arrangement in which power switching devices and conductors are associated with one phase (i.e., phase A) of a motor as described in FIG. 1 above, as well as the associated control electronics 20. In this arrangement, each phase winding of the motor consists of a group of individual conductors C0–C9, which are routed in a common bundle through the slots of the motor. In most conventional motor windings, numerous individual conductors are used, but each conductor is tied to a common terminal or bus bar in the motor. Each individual conductor shown in FIG. 2 requires four power switching devices, 21–32, arranged in an H-Bridge configuration. The sum total of all the current passing through the conductors C0–C9 at any instant in time is sensed by the current sensor 33. The current signal is sent to the control electronics which compares the current signal from sensor 33 to a target waveform and increases or decreases the number of power switches that are conducting as appropriate to minimize the departure of the total current sensed in any motor phase from the target waveform. By sequentially switching on and off the power switches to each conductor C0–C9 in series, rather than simultaneously switching on and off the power switches, the effective switching frequency seen by each phase of the motor is equal to the switching frequency of each power switch multiplied by the number of conductors. This allows each individual power switch to operate at a relatively low, efficient switching frequency, while the effective switching frequency for the entire motor phase is very high, providing high resolution tracking of the target current waveform and hence, low harmonic distortion.

Various other external sensors 34 such as rotary encoders, vibration sensors, etc. may be interfaced with the control electronics 20 so that various aspects of the motor performance can be used to make adjustments to the target waveform which may improve motor performance. For example, a rotary encoder or other sensor which provides feedback to the control electronics of the actual angular position of the motor rotor relative to the applied current waveform may be used to increase or decrease the amplitude of the sinusoidal target waveform to improve the efficiency of the motor under various speed and load conditions. Since the electromagnetic power developed by a motor at any given instant in time is equal to the current passing through each phase multiplied by the back-EMF generated by the motor on that phase, power output is maximized when the phase angle between the applied current waveform and the back-EMF generated by the motor is near zero. By increasing or decreasing the amplitude of the applied current waveform, the phase angle between the applied current waveform and the motor back-EMF waveform will be increased or decreased, respectively. And because the phase angle of the motor back-EMF is purely a function of rotor angular position, a rotary encoder or other angular position sensor on the rotor is suitable for this purpose.

As another example, a vibration transducer can be used to sense unwanted vibration on the stationary portion of the motor and provide a signal to the control electronics which is used to adjust the harmonic content of the applied current waveform to reduce the unwanted vibration. Although many sophisticated approaches have been developed that would be effective for this type of vibration control, a much simpler method is described herein below. This method consists of monitoring the vibration at some location on the stationary portion of the motor at the rotational frequency of the motor and some number of integer multiples, i.e., harmonics, of this frequency. The vibration measured would also inherently include the fundamental electrical frequency of the motor and its harmonics if a sufficient number of integer multiples of the motor rotational frequency are included. If the vibration signal at any particular harmonic exceeds a particular level, the controller will superimpose a signal on the target current waveform at the same frequency as the unwanted vibration, which has a known amplitude and phase angle relative to a reference point on the target current waveform. Since the current carrying conductors pass through magnetically permeable portions of the motor, i.e., the stator laminations, the current harmonics superimposed on the target waveform will induce vibratory excitation of the motor. If a shift in the phase and amplitude of the unwanted vibration is detected, then a vector solution for the required phase and amplitude of the required harmonic signal that must be superimposed on the target current waveform to cancel the unwanted vibration can be calculated and applied. On the other hand, if no shift in the phase and amplitude of the unwanted vibration signal is detected, a larger harmonic signal may be superimposed on the target waveform. However, it may be the case that the structural response of the motor at the particular frequency in question is such that the electromagnetic forces generated by the current passing through the motor have insufficient influence over the unwanted vibration to be of any use.

Methods similar to that described above for canceling vibration on the stationary portion of the motor can also be applied to torsional vibrations of the motor rotor as detected by the rotary encoder discussed hereinabove. Torsional vibrations of the motor rotor may not excite the stationary portion of the motor, but instead cause deleterious vibration of the load driven by the motor. These torsional vibrations are typically manifested as ripple superimposed on the angular velocity of the motor and, as such, can be detected using a rotary encoder or other high resolution angular position sensor.

Returning to FIG. 2, each of the power switches are equipped with a freewheeling diode 35–46 which permits inductive flyback energy from the motor windings C0–C9 to be dissipated in a controlled manner by clamping the voltage seen by the power switches to the potential at the positive and negative rails V+ and V−.

The control signals generated by the control electronics 20 which drive the power switches to the on or off state are provided by the control lines 100A–109A and 100B–109B. Additionally, the control electronics 20 may receive a COMMAND signal as shown in FIG. 2, which allows the fundamental frequency of the target current waveform to be increased or decreased, allowing control of motor speed. This command signal is typically a voltage or current signal, but may also be a digital signal which conveys a value to indicate the desired motor speed.

An analog implementation of the control electronics 20 shown on FIG. 2 is shown in FIG. 3. The outputs 100A–109A and 100B–109B are each driven by dedicated latches 47, which may consist of set-reset type flip-flops as shown (e.g., a 4013 CMOS devices or equivalent). Alternately, more sophisticated latch and power switch gate drives may be used if required due to the power switch rating and gate-type demands. The latches 47 are driven by decade counters 48, 49, 50 and 51 with decoded outputs (e.g., a 4017 CMOS device or equivalent). The decade counter outputs are such that each time the clock input receives a pulse, the output having a logic-high potential is incremented to the next consecutive output in sequence. The reset input of the decade counters R is used to bring the counter to a known starting point, where output Qø is high. This occurs when the input R is drawn to a low potential (i.e., ground or ø volts). When the reset input R is released (i.e., returned to a logic-high or 5 volts) the decade counter continues sequencing through the outputs starting with Qø in response to pulses provided at the clock input.

The clock input of the decade counters is driven by voltage controlled oscillators (VCO's) 52, 53, 54 and 55. As well known to those in the art, there are several commercially available VCO integrated circuits (IC's). Alternately, with minimal addition of passive components, a standard timer IC such as a 555 CMOS device can be used as a VCO also. The VCO's function is to generate pulses at a frequency which is proportional to an input voltage. In the case of the circuit shown in FIG. 3, the input voltage to the VCO's is generated by two proportional-integral-derivative (PID) control sections.

The first PID control section provides control signals when the target current waveform (TCW) in the phase winding is positive and the second provides control signals when the TCW is negative. The TCW is provided to both PID control sections by the waveform generator 56, which in a standard application would simply generate sinusoidal waveforms whose amplitude, frequency and phase are varied in response to input from the COMMAND signal or various other sensors 46 as discussed earlier. In some applications, it may be desirable to add harmonics to the fundamental sinusoidal TCW based on sensor input as discussed earlier hereinabove.

PID control section No. 1 consists of the differential amplifier 57, differentiating amplifier 58, summing amplifier 59, differential amplifier 60, summing amplifier 61, voltage divider 62, comparator 63, voltage divider 64 and NAND gate 65. PID control section No. 2 consists of the differential amplifier 66, the differentiating amplifier 67, summing amplifier 68, differential amplifier 69, summing amplifier 70, voltage divider 71, comparator 72 which shares the voltage divider 64 with the comparator 63 in PID control section No. 1 and NAND gate 73. All of the amplifiers, comparators and voltage dividers can be assembled in the circuit configurations shown schematically in FIG. 3 using standard resistor, capacitor and potentiometer elements with IC operational amplifiers such as the 741, 339, LF353N and numerous others having improved performance characteristics. Suitable NAND gates are provided by 4011 CMOS devices or equivalent.

The PID control sections each generate two output voltage signals to the VCO's. One output signal is sent to the VCO which drives the clock for the "Turn-on" counter 49 or 51 while the other output signal is sent to the VCO which drives the "Shut-off" counters 48 or 50. The equations which the PID control sections are designed to obey are as follows:

$(V_f)_{on} = V_{fo} + Ke + Ce'$ $(V_f)_{off} = V_{fo} + Ke - Ce'$

Where:

$(V_f)_{on}$=The voltage applied to input of the VCO driving "Turn-on" counter $(V_{fo})$=A reference or "integrand" voltage k=A proportional gain coefficient e=The error between the TCW and the actual measured current waveform (i.e., e=TCW−MCW)

c=A gain coefficient applied to the derivative of the error with respect to time (i.e., the derivative gain coefficient or damping coefficient)

e'=The derivative of the error e with respect to time $(V_f)_{off}$=The voltage applied to the input of the VCO driving the "Turn-off" counter As can be seen from the above equations, when the error e is zero, both the "Turn-on" counters and "Turn-off" counters are clocked at the same frequency, as determined by $V_f$ which is set by the voltage dividers 62 and 71. This causes the number of power switches conducting current through the motor winding to remain constant. Hence, total current remains constant as desired since there is no deviation from the TCW. If measured current exceeds the TCW, the value of e becomes less than zero. This will result in a decrease in $(V_f)_{on}$ and an increase in $(V_f)_{off}$, causing fewer power switches to be left conducting, except when the rate of change of e with respect to time, e', is large and positive. This latter case occurs when the value of e has taken a negative excursion and is returning toward zero. The value of e is still negative while e' has become a positive value. It is possible under such conditions for the product Ce' to exceed Ke, which causes $(V_f)_{on}$ to increase and $(V_f)_{off}$ to decrease. This condition represents the effect of damping on the response of the PID control loop and serves to minimize overshooting the TCW as the value of e approaches zero. The response of the PID control to positive values of e is similar to that described above for negative values of e, but the response will be reversed, subject to the value of e', which may cause the response to positive values of e to be augmented or curbed, as with negative values of e.

The circuit shown in FIG. 3 performs the algebraic operations described above using analog operational amplifiers. The circuit compares input signals from the waveform generator 56, which provides the TCW based on COMMAND input and various external sensors 46, to input from current sensors 45 to find the value of e and e'. The error e is calculated by the differential amplifiers 57, 66 and the differentiators 58, 67 calculate the value of e'. The circuit is divided into an upper and lower half, each of which responds to positive and negative values of the TCW, respectively.

For negative values of the TCW, the comparator 63 generates a logical-high output to "RA" which holds the shut-off counter 48 and turn-on counter 49 reset inputs, R, high, causing the counters 48, 49 to ignore any further clock inputs and remain locked in the reset condition with only the Qø output. The NAND gate 65 will have a logic-low output when both of its inputs are at a high logic potential. This allows the latch driving the power switch control line 100A to receive a low input at its set input, S, while the reset input receives a high input which causes the latch to reset accordingly.

While the upper half of the circuit is held in reset due to the negative value of the TCW, the lower half of the circuit tracks the actual current waveform sensed by the current sensor 45 and makes adjustments to the frequencies of the clock inputs being provided to the turn-on counter 51 and shut-off counter 50. The lower-half circuit determines the appropriate clock frequency to be applied to each counter by first calculating the difference between the TCW and the measured current using the differential amplifier 66. The proportional gain constant K is set using the potentiometer 74 which controls the amplifier gain. The output of the differential amplifier 66 is a voltage which corresponds to the product Ke. In parallel with the differential amplifier, a differentiating amplifier 67 calculates the time rate of change of e, e'. The potentiometer 75 is used to apply an adjustable gain to the value of e such that the output from the differentiating amplifier 67 is a voltage representing the product Ce'. The summing amplifier 68 adds the voltage outputs from the differential amplifier 66 and the differentiating amplifier 67 to yield a voltage representing Ke+Ce'. The differential amplifier 69 subtracts the voltage output from the summing amplifier 68 from a fixed voltage reference set by the voltage divider 71 which represents the integral constant $V_{fo}$.

Figure 3A:
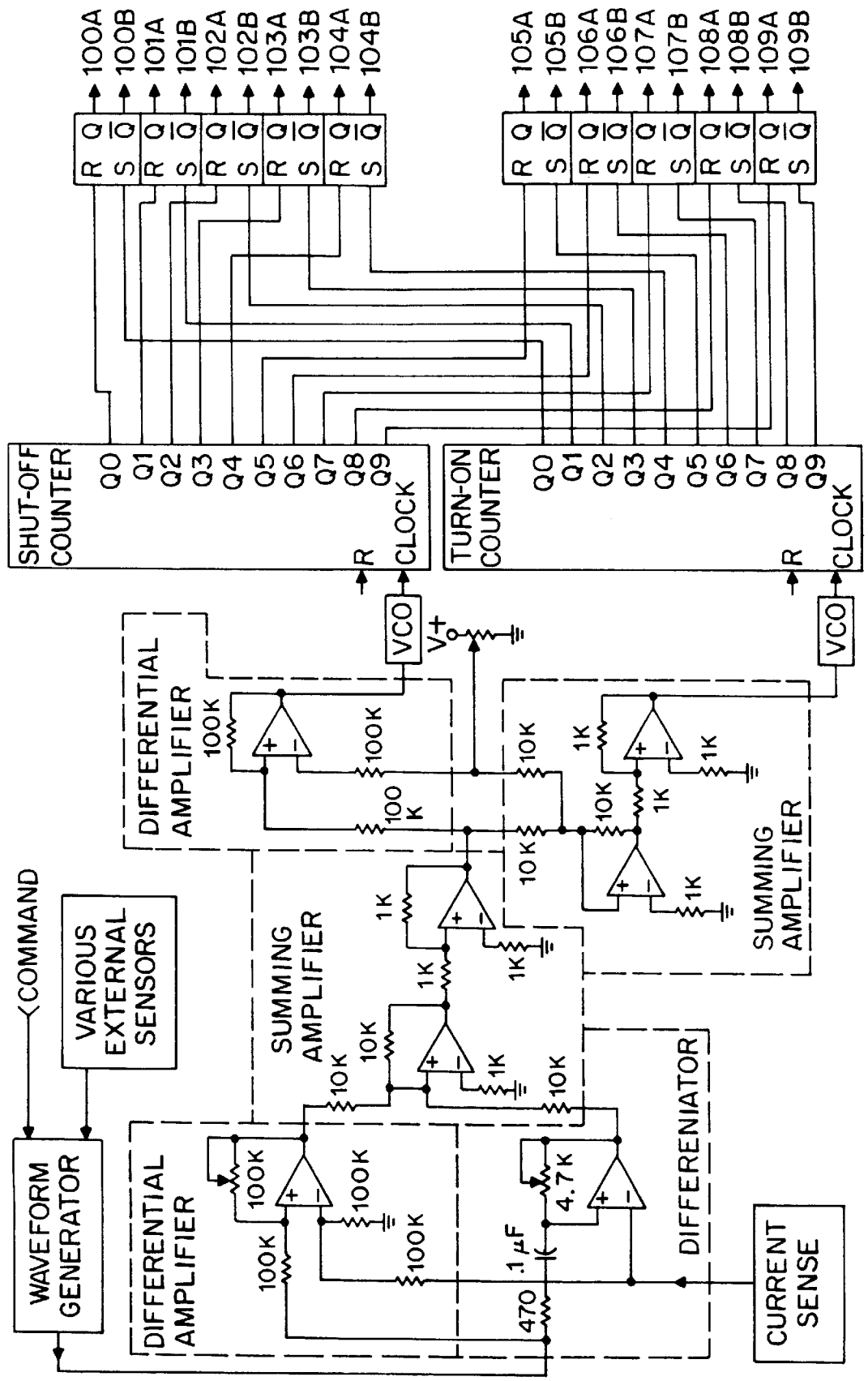
FIG. 3A is a schematic representation of a simplified analog control circuit for a multi-channel waveform synthesizer in accordance with the invention.

A simplified version of the analog control circuit shown in FIG. 3 is shown in FIG. 3A. In the circuit shown in FIG. 3, the upper half drives outputs 100A through 109A and the lower half drives outputs 100B through 109B. In the circuit shown in FIG. 3A, only one half of the circuit used in FIG. 3 is used to drive all outputs. This is accomplished by using the complementary outputs of the latches 47 to drive both of the sets of outputs. The Q outputs of the latches drive outputs 100A through 109A and the Q outputs drive outputs 100B through 109B. This approach yields a simpler circuit but increases the likelihood of "shoot-through", a fault condition where power switches in a given half-bridge, for example 21 and 22, are both in a transitional state. Momentarily, when one device is turning-on and the other device is turning-off, both devices conduct. This results in a direct short circuit from the positive rail to the negative rail of the DC power supply. Since this circuit path has very little inductance, a sudden rise in current can occur causing device failure. Shoot-through can be avoided when using complementary switching schemes mainly by selecting latch devices with very low propagation delay offsets between the Q and outputs, by using snubber capacitors to minimize rate of change of voltage across the device and other similar approaches which introduce losses or other undesirable design constraints on the circuit.

Figure 4:
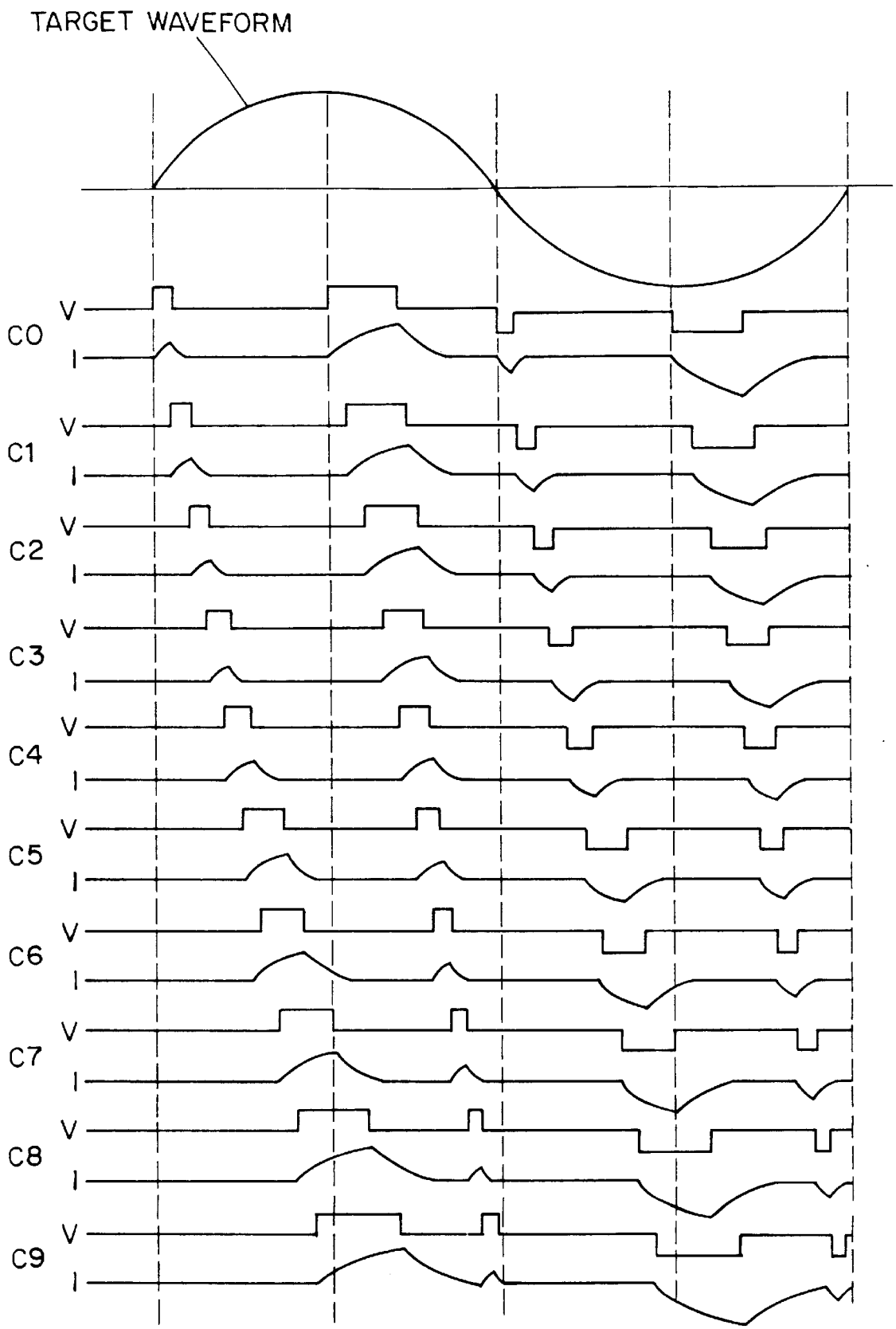
FIG. 4 is an illustration showing PWM voltage and current as a function of time in each conductor of a multi-channel current waveform synthesizer relative to a target waveform in a multi-channel electromagnetic winding arrangement in accordance with the invention.

The timing diagram shown in FIG. 4 illustrates the target current waveform (TCW) relative to the voltage waveforms C0V through C9V and current waveforms C0I through C9I for a given phase. As can be seen in the timing diagram, the pulse-widths of the voltage waveforms V for each channel of the phase winding grow wider as the magnitude of the TCW increases, causing a corresponding increase in the peak current reached by each channel. The sum of the currents I through each channel of the motor winding is compared to the TCW by the controller. The PID control electronics uses the error between the measured current and the TCW to adjust the turn-on or turn-off frequencies as discussed above.

Although the analog control circuit shown in FIG. 3 is capable of generating close approximations of a given TCW within the limitations of the power switching device switching speed and resolution, it is clear that a change in the turn-on or turn-off switching frequency will only occur when an error exists. Therefore, some error will almost always occur with this circuit, since the reference frequency is fixed and the TCW will generally require varying turn-on and turn-off frequency. An improved approach includes making adjustments to the reference frequency for both the turn-on and turn-off counters independently based on the magnitude of the error and its rate of change. However, this requires that the previously used turn-on and turn-off switching frequencies be stored and subsequently adjusted based on the magnitude of the error, e, and the rate of change of error, e'.

Figure 5:
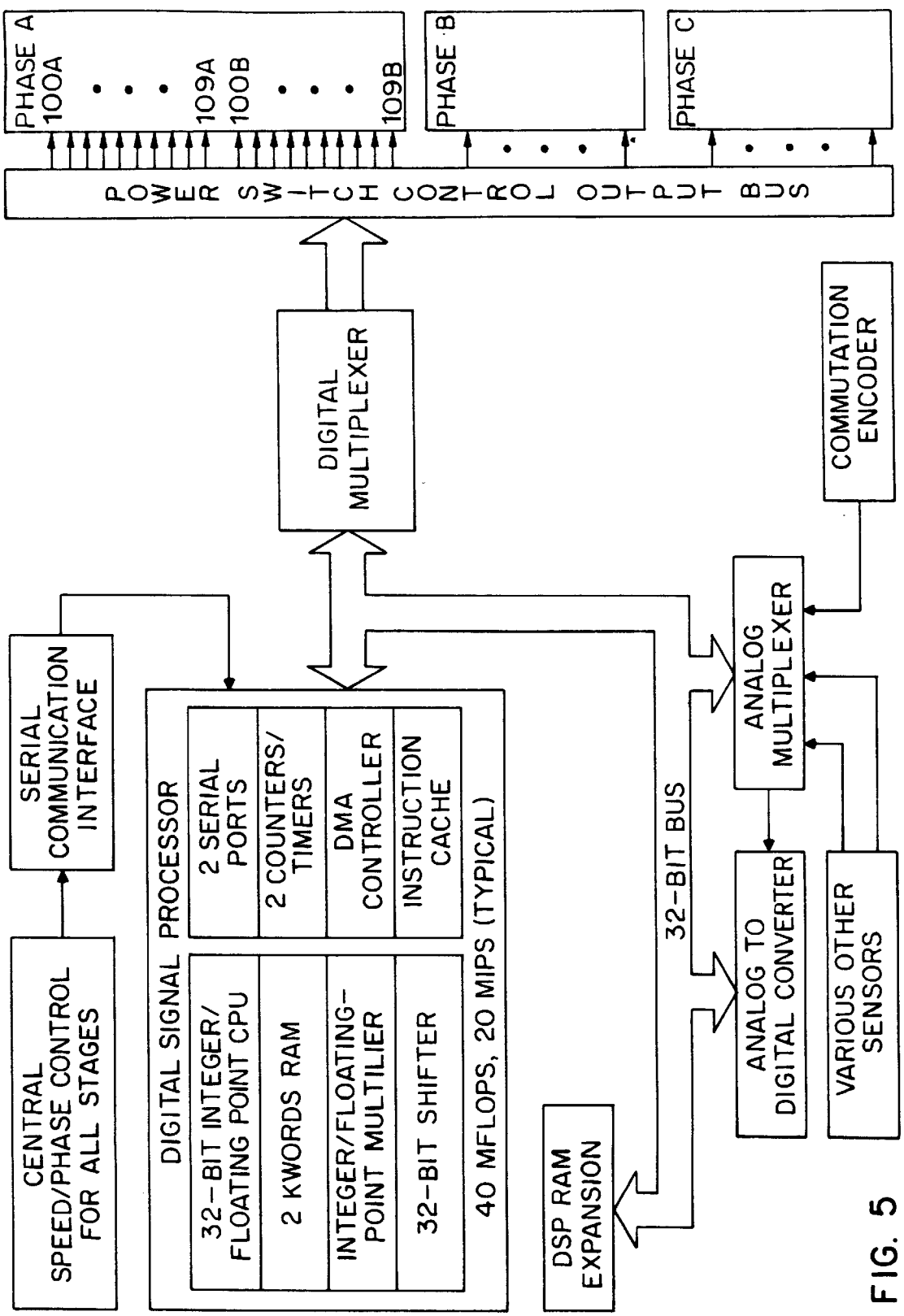
FIG. 5 is a schematic representation of a digital signal processor for a multi-channel waveform synthesizer in accordance with the invention.
Figure 6:
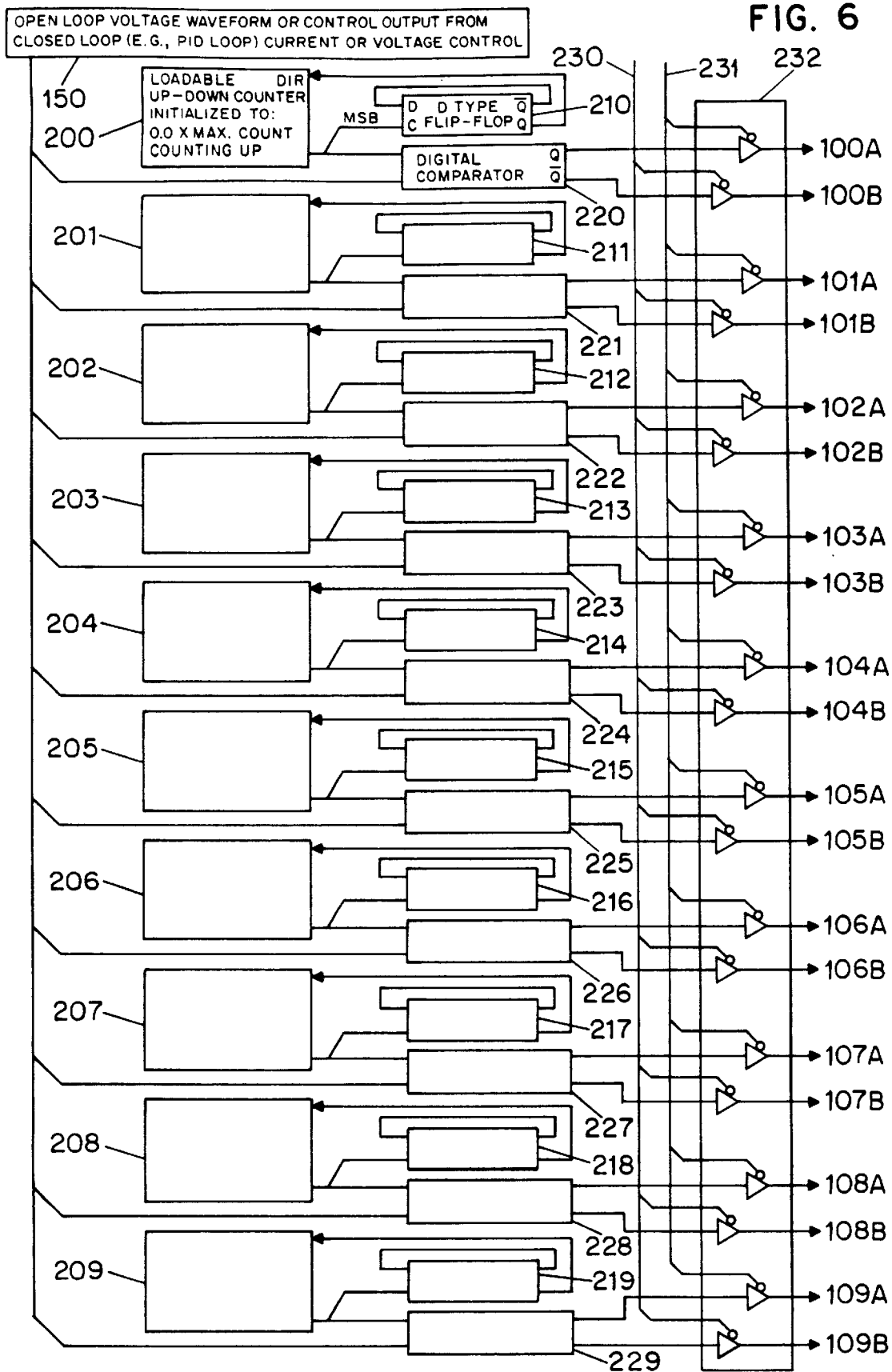
FIG. 6 is a schematic representation of an output circuit compatible with the digital signal processor shown in FIG. 5 in accordance with the invention.
Figure 7:
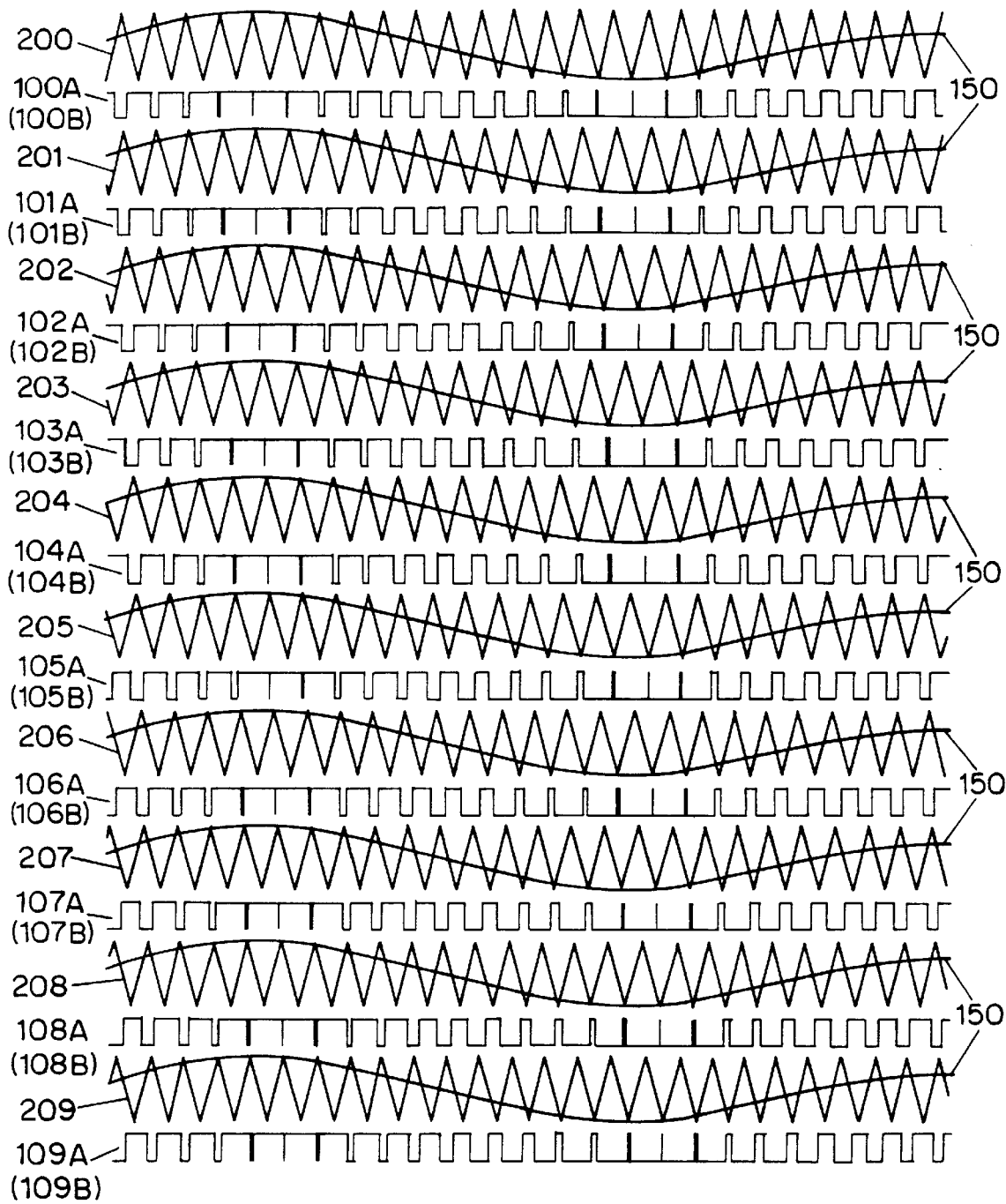
FIG. 7 is a graphical illustration showing digital output signals as a function of analog input signals for the circuit shown in FIG. 6.

The arrangement shown in FIG. 5 uses digital electronics to provide the storage and updating feature not provided by the analog circuit shown in FIG. 3. The Digital Signal Processor (DSP) executes a computer program which performs the mathematical operations performed by the amplifiers shown in FIG. 3. The intervals used to turn-on and turn-off the power switches in the control output bus are generated on each pass through the program loop and used as the reference intervals for the next program loop. The potential for approaching near zero error from the TCW is obtained with this approach, but the period of time required to execute the program loop can introduce latency error in the data acquired, i.e., the measured currents in each phase. This error can be compensated for by using known state estimation methods developed for digital signal processing as described in Ahmed, Irfan, *Digital Control Applications with the TMS 320 Family*, Texas Instruments Incorporation (1991); Ahmed et al., Digital Signal Processors Simplifying high-performance control, Machine Design, pp. 13–17 and pp. 35–81, Sep. 10, 1987, Bucella et al., Taking Control with DSPs, Machine Design, pp. 19–26, Oct. 12, 1989; Hanselmann, Herbert, Using Digital Signal Processors for Control, IECON '86, IEEE, pp. 27–32 (1986);

The circuit shown in FIG. 6 is an example of an output circuit that is compatible with the digital control circuit shown in FIG. 5. The control signal output from the closed loop current or voltage control algorithm, for example PID, state space, etc., from the DSP shown in FIG. 5 can be transmitted to the circuit shown in FIG. 6 directly in digital form. Alternatively, an open loop PWM voltage control arrangement can be produced by sending the desired voltage waveform directly to the input of the circuit shown in FIG. 5 in digital form. The waveform 150 is generated by the DSP and transmitted to the digital comparators 210–229 via parallel digital signal lines. The waveform signal is compared to the outputs of binary counters 200–209 which are initialized to values that are offset by a predetermined value to cause a staggered or interleaved output. The counters may be unidirectional to provide a saw-tooth type output or bidirectional, that is up-down, output to produce a triangle output as shown in FIGS. 6 and 7. The D-type flip-flops 210–219 are used to change the direction of the counters when a terminal count condition is reached. In the circuit shown in FIG. 6, the most significant bit MSB, of the counter output is connected to the clock inputs C of the flip-flops. The Q output from the flip-flops is routed to the D input of the flip-flops to form a toggle response to clock pulses. The Q outputs of the flip-flops are routed to the direction control input of the counters 200–209, so that each time the flip-flops toggle, the direction of the counter, whether it is counting up or down is changed.

For the circuit in FIG. 6 to function properly, the D-type flip-flops selected must be triggered on the rising edge of a pulse applied to the clock input C. For example, if 16 bit counters are used and the output for bit 12 is used as the MSB for the maximum counter value, the counter would count up to $2^{12}$ decimal and the MSB would transition to a logic high value. The rising edge of this signal would toggle its respective flip-flop and switch the direction of the counter. The counter would then count down to 0 and roll over to $2^{16}-1$, which again would set the MSB bit, changing the direction of the counter. In an alternate arrangement a counter with a terminal count flag which is set when the counter reaches its maximum count value counting up and is set again when the counter reaches zero counting down may be used. This latter arrangement eliminates the momentary roll-over that results in an undesirable $2^{16}-1$ value at the zero count.

The tri-state buffers 232 shown in FIG. 6 can be used to produce a non-complementary output from the comparators 220–229. For closed loop current control algorithms or other control approaches that permit a signal representing current to be accessed, it is possible to disable outputs to switching devices which are not actively conducting current. This arrangement is referred to as non-complimentary drive output and is generally preferred if permitted by the control methodology to avoid shoot-through or unwanted circulating currents.

In the circuit shown in FIG. 6, providing logic high signals or enable signals to the tri-state buffer control inputs 230,231 at all times will result in conventional complimentary output. For the purpose of describing non-complimentary operation, it is assumed that outputs 100A–109A drive switching devices that permit currents to flow in the "positive" direction through the multi-channel winding and outputs 100B–109B drive switching devices that permit current to flow in the "negative" direction through the multi-circuit winding. When current is flowing in the positive direction input 230 may be disabled to disable all outputs 100B–109B which drive devices that carry negative current. Conversely, input 231 may be disabled when current is flowing in the negative direction.

FIG. 7 illustrates the digital output from the circuit shown in FIG. 6 as a function of the input analog control waveform 150. The outputs from counters 200–209 are shown with approximately equal offset. While only the resulting comparator output for drive outputs 100A–109A are shown in FIG. 7, it is clear that for complimentary operation, the outputs 100B–109B would simply be the inverse of the outputs shown for 100A–109A. It is also clear to those skilled in the art that any number of channels can be supported by the arrangement shown in FIG. 6 and both equal and unequal counter offsets can be used if desired.

Figure 8:
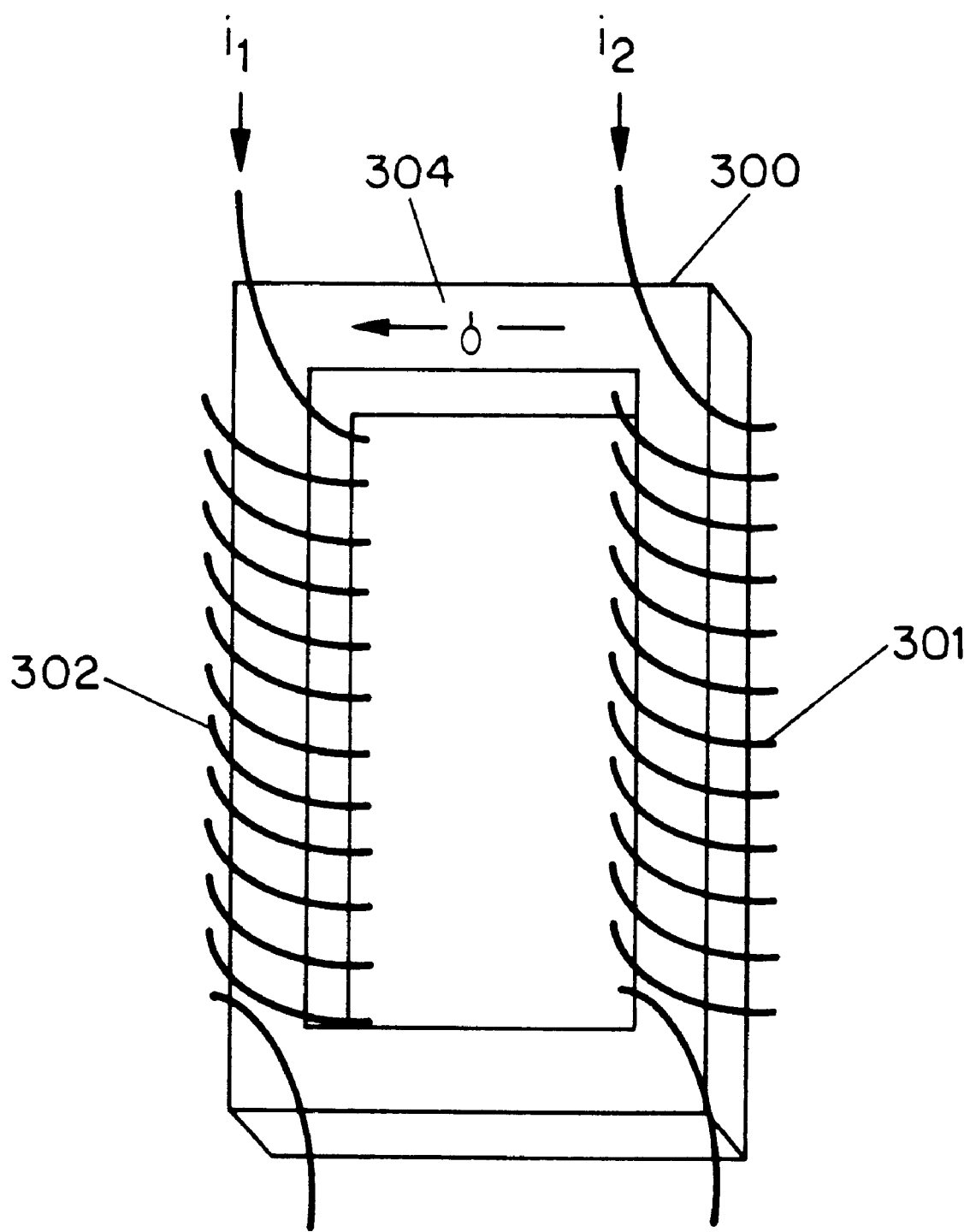
FIG. 8 is a schematic representation of a two pole interphase transformer arrangement.

A typical two pole interphase transformer arrangement is shown in FIG. 8. The core 300 is typically a soft ferromagnetic material such as laminated silicon steel, an amorphous alloy or ferrite. The windings 301, 302 carry currents i2 and i1, respectively. The windings are balanced such that when i1 and i2 are equal the flux 304 in the core is zero. However, any difference between i1 and i2 will generate induction in the core and give rise to mutual inductance between the windings for time varying differential currents. This type of transformer is commonly used to enable two switching device bridges to drive a common output while the two bridges remain isolated from one another by the impedance provided by the mutual inductance of the two windings. While it is preferable to minimize use of such power magnet components in the present invention, in some applications it may be useful to use interphase transformers to improve the motor circuit reactance to differential mode currents or to reduce the total number of channels in the motor winding to simplify interconnects between the motor and drive.

Figure 9:
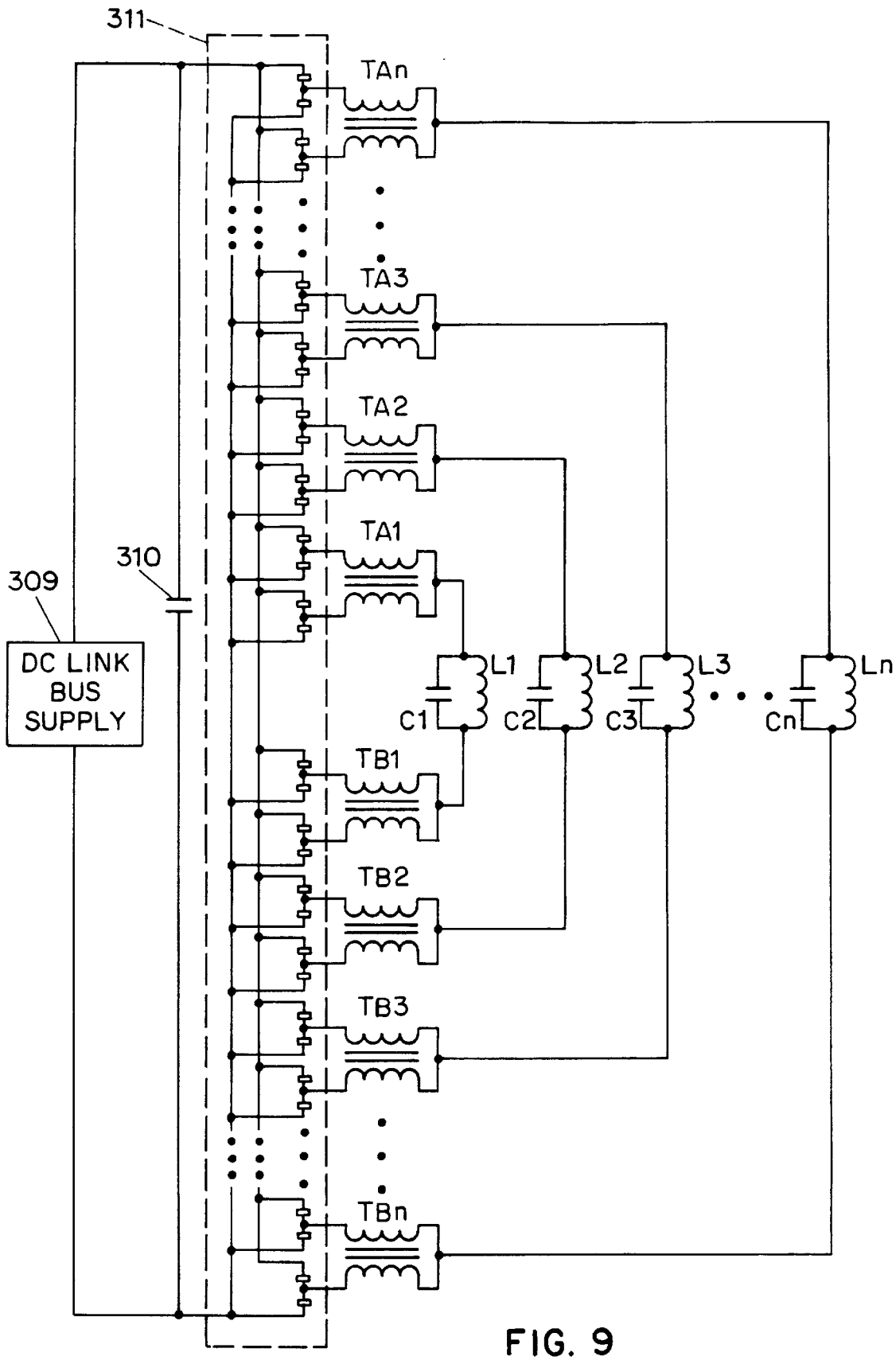
FIG. 9 is a schematic representation of an arrangement utilizing interphase transformers to enable multiple half bridges to drive on each side of a single motor winding channel in accordance with the invention.

FIG. 9 shows an arrangement where interphase transformers are used to enable two half bridges to drive on each side of a single motor winding channel. The DC link bus supply 309 provides power to the main bus of the drive which is stabilized with link bus capacitors 310. The switching device bridges 311 are grouped in pairs. Each of the half-bridge outputs in each pair are connected to input poles of a dedicated interphase transformer. The output poles of the interphase transformers TA1, TA2, . . . , TAn and TB1, TB2, . . . , TBn are connected to each other and one side of a motor winding channel L1, L2, . . . , Ln. The bypass capacitors CA, C2, . . . , Cn may also be added to bypass high frequency PWM switching current harmonics around the motor windings. The leakage reactance of the interphase transformers must be adequate to avoid exceeding peak current ratings in the bridges 311 during switching transients when bypass capacitors are used, otherwise additional inductive elements must be added. For the configuration shown in FIG. 9, it is preferable to connect the interleaved PWM drive signals to the gates of the switching devices such that the two bridges on each interphase transformer operate on PWM signals which are directly out-of-phase on the PWM cycle, e.g., one of the half-bridges connected to TA1 would receive PWM drive signals 100A and 100B for its high and low side devices, respectively, and the other half-bridge would receive PWM drive signals 105A and 105B for its high and low side device, respectively; one bridge connected to TA2 would receive drive signals from 101A and 101B for its high-side and low-side devices, respectively, and the other bridge connected to TA2 would receive drive signals from 106A and 106B for its high and low side devices, respectively; and so on up to TA5 in the case of a ten bridge/five channel arrangement, with bridges connected to TB1–TB5 having drive signals for high and low side devices reversed relative to TA1–TA5.

Although the invention has been described herein with reference to specific embodiments, many modifications and variations will readily occur to those skilled in the art. For example, the multi-channel motor winding configuration disclosed herein can be applied to a number of electromagnetic devices. As is clear to those skilled in the art, a single phase motor can be configured as shown in FIG. 2 just as easily as an individual phase of a three-phase motor. Single or multi-phase transformer windings can also be similarly configured. Additionally, any of these multi-phase devices can be configured in a wye arrangement instead of a delta winding as shown in FIG. 2. This latter arrangement provides a potential for reducing the number of switching devices for each phase by half if the separate channels of each phase are connected to a common junction at the center of the wye.

I claim:

1. A multi-channel electromagnetic winding arrangement comprising an electromagnetic winding comprising at least one phase, each of the at least one phase comprising at least two channels including means for generating different current waveforms for each channel, each channel comprising at least one conductor wherein each conductor in each channel is electrically isolated from conductors in other channels, at least one switching means controlling each channel and dedicated thereto, and control means for controlling the switching means so as to produce a composite current waveform from the different current waveforms generated by each channel.

2. A multi-channel electromagnetic arrangement in accordance with claim 1 further comprising a current sensor for measuring the composite current waveform produced from the current waveforms generated by each channel.

3. A multiple-channel electromagnetic arrangement in accordance with claim 1 wherein the switching means are four switches arranged into two groups, each group including two switches in series between high and low voltage rails and wherein the midpoint between two switches in one group is connected to one end of a conductor and the midpoint between the two switches in the other group is connected to the other end of the conductor.

4. A multi-channel electromagnetic arrangement in accordance with claim 1 wherein the controller comprises means for turning on and turning off each switch in a predetermined sequence for an interval which is varied in response to the magnitude of the difference between the composite current waveform produced from the current waveforms generated by each channel and a desired current waveform.

5. A multi-channel electromagnetic arrangement according to claim 1 further comprising digital signal processing means which generates at least one digital waveform, a plurality of counters, each counter being clocked at the same frequency and having the same count range and different initialization values from any other counter, and a plurality of digital comparators for comparing the at least one digital waveform to the values of the plurality of counters for use in providing drive signals to the at least one switching means.

6. A multi-channel electromagnetic arrangement according to claim 5 further comprising a current sensor for measuring the composite current waveforms wherein the digital signal processing means generating a desired aimed waveform and calculates the difference between the composite and current waveform and the desired aimed waveform and modifies the waveform at least one digital to minimize the difference.

7. A multi-channel electromagnetic arrangement according to claim 6 wherein the digital signal processing means includes proportional-integral-derivative control means.

8. A multi-channel electromagnetic arrangement according to claim 1 including a plurality of switching means arranged in sets, and at least one interphase transformer dedicated to at least one set of switching means, the interphase transformer including at least two inputs and at least one output, each output of each set of switching means connected to an input of the dedicated at least one interphase transformer and each output of each interphase transformer connected to at least one channel of the electromagnetic winding.

9. A multi-channel electromagnetic winding arrangement according to claim 8 comprising n interphase transformers and n pairs of switch means, the switch means switched on and off in a sequence given by 1, 2, 3, . . . , 2n, the switch means paired such that the outputs from switch numbers k and k+n in the sequence are connected to a common interphase transformer, for k equals 1 to n.

10. A multi-channel electromagnetic winding arrangement as in claim 8 further comprising at least one capacitor connected across at least one channel of the electromagnetic winding.

11. A multi-channel electromagnetic winding arrangement according to claim 1 wherein the conductors of the at least one phase pass through a magnetically permeable material that is responsive to the vibratory excitation from the magnetic field generated by the composite waveform, the control means comprising at least one vibration sensing means for sensing vibration from the magnetically permeable material, the control means further comprising means to modify the composite current waveform to minimize the vibration sensed by the vibration sensing means.

12. A multi-channel electromagnetic winding arrangement according to claim 1 comprising at least one switch means for controlling current through each channel in a positive direction and at least one switch means for controlling current through each channel in a negative direction, the switch means for the positive direction and negative direction being controlled in a complementary manner.

13. A multi-channel electromagnetic winding arrangement according to claim 1 comprising at least one switch means for controlling current through each channel in a positive direction and at least one switch means for controlling current through each channel in a negative direction, the switch means for the positive direction and negative direction being controlled in a non-complementary manner.

14. A controller for producing different current waveforms in a multi-channel electromagnetic winding arrangement having a plurality of channels which are electrically isolated from each other and at least one switch for controlling current through each channel in the arrangement, the controller comprising means for turning on and turning off each switch in a predetermined sequence for an interval which is varied in response to the magnitude of the difference between a composite current waveform produced from different current waveforms generated by each channel and a desired current waveform.

15. A method for producing a current waveform in a multi-channel electromagnetic arrangement comprising the steps of:

providing an electromagnetic winding including means for generating at least one current waveform, said means comprising at least two channels, each channel comprising at least one conductor wherein each conductor in each channel is electrically isolated from conductors in other channels, each channel including at least one switching means, and producing a composite current waveform from different current waveforms generated by each channel by controlling the switching means with a controller.

16. A method for producing a current waveform in a multi-channel electromagnetic arrangement in accordance with claim 15 comprising measuring the composite current waveform produced from current waveforms generated by each channel with a current sensor.

17. A method for providing a current waveform in a multi-channel electromagnetic arrangement in accordance with claim 15 comprising controlling each channel with a switching means comprising four switches arranged into two groups, each group including two switches in series between high and low voltage rails and wherein the midpoint between two switches in one group is connected to one end of the conductor and the midpoint between the two switches in the other group is connected to the other end of the conductor.

18. A method for providing a current waveform in a multi-channel electromagnetic arrangement in accordance with claim 15 wherein the controller includes digital processing means, a plurality of counters and a plurality of digital comparators and further comprising generating at least one digital waveform from the digital processing means, comparing the output values of the counters to the at least one digital waveform with the plurality of digital comparators, obtaining the output from the plurality of digital comparators, and providing drive signals from the digital processing means to the at least one switching means based on the output from the plurality of digital comparators.

19. A method for producing a current waveform in a multi-channel electromagnetic arrangement in accordance with claim 18 wherein the controller includes a current sensor for measuring the composite waveform in each of a plurality of phases and further comprising, generating a desired current waveform with the digital signal processing means, determining the difference between the composite current waveform produced from current waveforms generated by each channel and the desired current waveform; and modifying the digital waveform to minimize the difference.

20. A method for producing a current waveform in a multi-channel electromagnetic arrangement in accordance with claim 19 comprising applying drive signals from the digital processing means to the at least one switching means which minimizes the difference between the composite current waveform produced from current waveforms generated by each channel and the desired current waveform.

21. A method for producing a current waveform in a multi-channel electromagnetic arrangement in accordance with claim 19 wherein the controller turns each switching means off and on in a predetermined sequence at a rate which is varied in response to the magnitude of the difference between the composite current waveform produced from the current waveforms generated by each channel and a desired current waveform.

22. A method according to claim 15 comprising providing a plurality of switching means arranged in sets, and at least one interphase transformer dedicated to at least one set of switching means, the interphase transformer including at least two inputs and at least one output, each output of each set of switching means connected to an input of the dedicated at least one interphase transformer and each output of each interphase transformer connected to at least one channel of the electromagnetic winding.

23. A method for producing a current waveform in a multi-channel electromagnetic arrangement in accordance with claim 15 comprising applying a proportional-integral-derivative control algorithm to the difference between the composite current waveform produced from current waveforms generated by each channel and the desired current waveform to generate drive signals.

* * * * *

UNITED STATES PATENT AND TRADEMARK OFFICE
CERTIFICATE OF CORRECTION

PATENT NO.     : 6,232,731 B1
DATED          : May 15, 2001
INVENTOR(S)    : John H. Chapman It is certified that error appears in the above-identified patent and that said Letters Patent is hereby corrected as shown below:

Title page,
Item [56], References Cited, U.S. PATENT DOCUMENTS:
Insert -- 4,873,478     10/1989     Weiss .....     318/779 --

Drawings
Figure 3A, "DIFFERENIATOR" should read -- DIFFERENTIATOR --.

Column 1,
Line 41, "KHZ" should read -- kHz --.

Column 4,
Lines 50, 52 and 59, "KHZ" should read -- kHz --.
Line 65, "KW" should read -- kW --.

Column 13,
Line 12, "generating" should read -- generates --.
Line 15, "waveform at least one digital" should read -- at least one digital waveform --.
Line 26, "connected" should read -- being connected --.

Signed and Sealed this

Fourth Day of June, 2002

*Attest:*

JAMES E. ROGAN
*Attesting Officer*     *Director of the United States Patent and Trademark Office*